(12) United States Patent
Tunnacliffe et al.

(10) Patent No.: US 7,153,430 B2
(45) Date of Patent: Dec. 26, 2006

(54) BIOLOGICAL DIGESTION OF WASTE FLUIDS WITH PARTICLES COMMINUTING STEP

(75) Inventors: Alan Garth Tunnacliffe, Cambridge (GB); Jens Lapinski, Cambridge (GB)

(73) Assignee: Cambridge University Technical Services Limited (GB)

( * ) Notice: Subject to any disclaimer, the term of this patent is extended or adjusted under 35 U.S.C. 154(b) by 0 days.

(21) Appl. No.: 10/506,024

(22) PCT Filed: Mar. 10, 2003

(86) PCT No.: PCT/GB03/01007

§ 371 (c)(1),
(2), (4) Date: Mar. 11, 2005

(87) PCT Pub. No.: WO03/076345

PCT Pub. Date: Sep. 18, 2003

(65) Prior Publication Data

US 2005/0155930 A1 Jul. 21, 2005

(30) Foreign Application Priority Data

Mar. 8, 2002 (GB) ................................ 0205509.3

(51) Int. Cl.
*C02F 3/00* (2006.01)
(52) U.S. Cl. ............... 210/620; 210/628; 210/173; 210/174
(58) Field of Classification Search ................ 210/620, 210/628, 173, 174
See application file for complete search history.

(56) References Cited

U.S. PATENT DOCUMENTS

| 3,772,188 A | * | 11/1973 | Edwards ............... 210/629 |
| 3,914,164 A | | 10/1975 | Clark ................... 204/149 |
| 4,303,528 A | | 12/1981 | Shibayama ............. 210/615 |
| 4,348,285 A | | 9/1982 | Groeneweg et al. |
| 4,432,869 A | | 2/1984 | Groeneweg et al. |
| 5,282,980 A | * | 2/1994 | Kew et al. ............. 210/787 |
| 6,635,178 B1 | * | 10/2003 | Bowman et al. ......... 210/609 |
| 6,824,086 B1 | * | 11/2004 | Mazurkiewicz et al. ..... 241/5 |

FOREIGN PATENT DOCUMENTS

| DE | 4114694 | 11/1992 |
| DE | 4204607 | 8/1993 |
| DE | 4214607 | 8/1993 |

(Continued)

OTHER PUBLICATIONS

Miquelis et al. "Impact of Turbulence and Turbidity on the Grazing Rate of the Rotifer Brachionus Calyciflorus (Pallas)." Hydrobiologia. vol. 386. 1998. pp. 203-211.

(Continued)

*Primary Examiner*—Chester T Barry
(74) *Attorney, Agent, or Firm*—Bourque and Associates (57) ABSTRACT

The present invention relates to a method for the aerobic digestion of a fluid waste material, notably an aqueous sewage, in which at least part of the waste material and/or of the digestion mixture is comminuted to reduce the median particle size of biomass and other solid particles in the digestion mixture to less than 10 micrometres, for example using destructive cavitation with a pressure drop of from 2 to 7.5 Bar. The comminution produces particles which are preferentially ingested by predator organisms in the digestion stage so that they graze on the bacteria and biomass particles and thus reduce the amount of biomass and suspended solids produced in the digestion stage. The invention also relates to apparatus for use in the method of the invention.

25 Claims, 2 Drawing Sheets

FOREIGN PATENT DOCUMENTS

| | | |
|---|---|---|
| GB | 9802339 | 2/2000 |
| JP | 10000493 | 1/1998 |

OTHER PUBLICATIONS

Rensink et al. "Using Metazoa to Reduce Sludge Production." Wat. Sci. Tech. vol. 36—No. 11. pp. 171-179.

Schubert et al. "Particle Size Distribution in Effluent of Trickling Filters and in Humus Tanks." Wat. Res. vol. 35—No. 16. 2001. pp. 3993-3997.

Low et al. "Reducing Production of Excess Biomass During Wastewater Treatment." Wat. Res. vol. 33—No. 5. 1999. pp. 1119-1132.

Lubzens et al. "Mariculture in Israel—Past Achievements and Future Directions in Raising Rotifiers as Food for Marine Fish Larvae." Hydrobiologia. vol. 358. 1997. pp. 13-20.

Lee et al. "Reducing Sludge Production in Aerobic Wastewater Treatment Through Manipulation of the Ecosystem." Wat. Res. vol. 30—No. 8, 1996. pp. 1781-1790.

Attetia et al. "Aggregation Rates of Natural Particle Populations." Wat. Res. vol. 35—No. 10. 2001. pp. 2429-2434.

Dalentoft et al. "The use of The Kaldness Suspended Carrier Process in Treatment of Wastewaters from the Forest Industry." Wat. Sci. Tech. vol. 35—No. 2, 3. 1997. pp. 123-130.

Dezfuli et al. "The Origin and Function of Cement Gland Secretion in Pomphorhynchus laevis (Acanthocephala)." Parasitology. vol. 19, 1999. pp. 649-653.

Calaway, W.T. "The Metazoa of Waste Treatment Processes—Rotifiers." Journal WPCF. vol. 40—No. 11. pp. R412-R422.

Snidaro et al. "Characterization of Activated Sludge Flocs Structure." Wat. Sci. Tech. vol. 36—No. 4. 1997. pp. 313-320.

Vladstein et al. "Particle Size Dependent Feeding by the Rotifer Brachionus Plicatilis." Rotifer Symposium VI. 1993. pp. 261-267.

Weemaes et al. "Evaluation of Current Wet Sludge Disintegration Techniques." J. Chem. Technol. Biotechnol. vol. 73. 1998. pp. 83-92.

Mayhew et al. "Low Biomass Yield Activated Sludge: A Review." Environmental Technology. vol. 18. 1997. pp. 883-892.

International Search Report for PCT/GB03/001007.

* cited by examiner

BIOLOGICAL DIGESTION OF WASTE FLUIDS WITH PARTICLES COMMINUTING STEP

The present invention relates to a method, notably to a method for treating fluid waste materials, especially for digesting sewage waste, and to apparatus for use in that method.

BACKGROUND TO THE INVENTION

Many processes and operations in current use result in fluid waste products which must be treated before they can be recycled for re-use in the process or operation from which they have been derived, or to meet ever increasingly severe requirements before they can be discharged into the environment. Sources of such waste materials include the chemical, pharmaceutical, food processing and brewing industries; agricultural sources, such as animal husbandry, notably intense rearing of poultry, cattle and pigs, and abattoirs; and municipal and other sewage systems. Many of such waste materials are water based and it is desirable to reclaim that water for re-use and/or to purify it to sufficient extent to be able to recycle the treated water into the water usage system, for example by discharge of the treated water into rivers, lakes or reservoirs.

The term fluid waste material will be used hereinafter to denote in general a waste material from any source which has a fluid, notably water, as a major component. For convenience, the invention will be described hereinafter in terms of the treatment of municipal sewage, that is the discharge from foul water drainage systems, as the fluid waste material.

A typical method for the treatment of such waste material is to subject the material to aerobic boilogical digestion in the fluid phase so as to reduce the biological oxygen demand of the treated water to within mandatory limits so that it may be discharged to the environment. Such treatment can take place in the fluid phase in an aerated or agitated vessel containing the waste to be treated. A preferred form of such a fluid phase digestion treatment is known as the activated sludge treatment. In such a process, aeration keeps the solid particles of waste suspended in the fluid phase and enables bacteria, fungi, protozoa, metazoa and other boilogical organisms to utilise the suspended and soluble components of the sewage for the digestion process during which a biomass is built up. For convenience, the invention will be described hereinafter in terms of such an activated sludge process.

During an activated sludge process, a biomass is produced as a result of the bacterial digestion of components within the fluid waste. The term biomass is used herein to denote the live and dead bacteria and other organic materials dissolved in or suspended in the fluid phase of the digestion mixture. Part of this biomass accumulates as flocs or particles which are suspended in the aqueous phase and settle out in a subsequent settling tank or other sedimentation operation. The biomass and settled solids must be removed from the system to prevent their accumulation to excessive extents. It is also required by legislation that the effluent water contain less than stated levels of various materials and suspended solids before it can be discharged to the environment. The removed biomass and other solids are disposed of as a waste product from the system, although part of the biomass may be recycled for admixture with incoming sewage to provide and maintain the necessary bacterial population for the digestion stage. The treated water can then be discharged as the effluent from the system or may be subjected to further treatments.

The regulations and legislation governing the nature and quality of the effluent and the disposal of the biomass are becoming increasingly stringent. These, and awareness of the environmental effects of disposal of the biomass, are making conventional disposal techniques unacceptable. For example, the use of the biomass, or sewage sludge as it is also known, as a fertiliser on the land, or disposal in the sea are no longer acceptable. The cost of disposal of the biomass now represents about 60% of the cost of operating an activated sludge process and the need for an economic yet environmentally acceptable method for reducing the problem of biomass disposal still exists.

One proposal for reducing the problem has been to reduce the amount of biomass produced by the activated sludge process by the use of predator organisms which graze upon the bacteria causing digestion of the waste material. Ciliated protozoa and other metazoa, such as rotifers and oligochaete worms, are stated to be predators for the types of bacteria normally present in an activated sludge process. However, they are normally present in only a few tens or hundreds of organisms per litre in a conventional activated sludge process and do not normally have any significant effect on the digestion process and the production of biomass. It has been proposed that such predators could be held on a filter trap so that they are not swept through the system by the volumes of water being treated and can accumulate and thus have an effect on reducing the amount of biomass produced. However, this was a laboratory proposal using synthetically cultivated bacteria and ciliate predators using a synthetic nutrient composition. In a practical process, the population of such predator organisms which could be maintained is restricted by the available nutrient level in the waste material. As stated above, in a conventional activated sludge process, this population is too small to have any significant effect on the amount of biomass produced.

We have now found that if the median primary particle size of the biomass and other solids in the digestion stage of an aqueous waste material aerobic bacterial treatment process, notably an activated sludge process for the treatment of municipal sewage, is reduced to less than 10, preferably from 1 to 6, notably from 1 to 3, micrometres, then the quality, notably the suspended biomass solids content, of the treated water is enhanced. We have found that this particle size range corresponds to that at which ingestion of solid particles by rotifers and other predator organisms, such as ciliate filter feeders, is optimised and that the organisms obtain the nutrients from the ingested solids without the need to rupture the cell walls. As a result, the ingestion of biomass and other solids by the predator organisms in the waste water is increased as compared to where the biomass particle size range contains significant proportions of particles outside this range. The optimisation of the particle size for ingestion by the predator organisms enables a higher population of the predator organisms in the waste digestion stage to be supported than where no comminution has taken place. As a result, a useful reduction in biomass production in the digestion stage can be achieved without the need for additional nutrients or the expenditure of uneconomically large amounts of energy.

SUMMARY OF THE INVENTION

Accordingly, the present invention provides a method for the aerobic biological, notably bacterial, digestion of a fluid waste material, notably an aqueous waste containing particulate solids, characterised in that at least part of the solids in or produced from the fluid during the digestion stage are subjected to a particle comminution step so as to reduce the median particle size of those particulate solids to less than 10 micrometres, preferably to within the size range 0.2 to 10, preferably 1 to 6, micrometres, without causing significant rupture of cell walls of cellular material within the solids.

It has been proposed in a laboratory simulation of an activated sludge process to subject solid biomass particles to ultrasonic disintegration, shear working and other high energy disintegration techniques. However, the objective of such a proposal was to rupture the cell walls of cellular material in the biomass so as to release proteins and other intra-cellular nutrients for consumption by the bacteria used in the waste material digestion stage. The size reduction processes were therefore deliberately operated at sufficiently high energy levels to cause rupture of cell walls of a high proportion of the solid particles. This is both energy intensive and expensive and is not feasible for use on a large scale, low cost process, such as an activated sludge process for the treatment of municipal sewage. In the present invention, the comminution, or size reduction, process is carried out at a significantly lower energy level so that substantially no cell wall rupture takes place, that is only a minor proportion of, preferably less than 20%, of the cells are ruptured. Typically, less than 10% of the cells are ruptured in the present invention. As a result, the process of the invention can be applied economically to part or all of the fluid fed to and/or circulating in an activated sludge process to achieve a significant reduction in biomass production from such a process.

It has also been proposed to apply low energy ultra sonic disintegration techniques to the solid flocs in a laboratory scale simulation of an activated sludge process. The objective in such a proposal was to break up large sized flocs to investigate the nature and behaviour of the primary particle size solid particles in the digestion stage. However, is was stated that this process resulted in the presence of large amounts of fine particles suspended in the aqueous phase and that this deleteriously affected the filtration properties of the resultant suspension, which would be detrimental on a commercial scale activated sludge process. However, in an activated sludge process where predator organisms are present, we have found that the predator organisms graze preferentially upon such fine particles and thus reduce the overall solids content of the effluent water. Thus, this apparently adverse property of low energy working of the biomass is turned to a benefit.

We have found that particles within the size range 0.2 to 10 micrometres are preferentially ingested by predators, notably rotifers. As a result, if the median particle size of at least part of the suspended biomass particles is reduced to less than 10 micrometres, the organisms can be used to reduce the biomass both by grazing on the bacteria which form the biomass and on the fine particle size biomass produced by the comminution step. By grazing on the suspended solids, the predators reduce the suspended solids in the water effluent, which is thus clarified and more suitable for discharge into the environment.

Accordingly, from a preferred aspect, the present invention provides a method for the treatment of a fluid waste material, notably a municipal sewage, in which the waste material is subjected to fluid phase aerobic bacterial digestion in a digestion stage to produce biomass particles and a water effluent, preferably in an activated sludge process, characterised in that:

a. at least part of the digestion of the waste material is carried out in the presence of a population of predator organisms which graze upon at least some of the bacteria used to digest the waste material, which population is maintained at a level of at least 10,000 of such organisms per litre of the fluid phase in the digestion stage; and b. at least part of the waste material and/or the biomass and other solids present in the digestion stage are subjected to a comminution process so as to reduce the median particle size of the comminuted solids to less than 10 micrometres, without causing significant cell rupture of cellular components of the waste material or biomass, so as to enhance ingestion, or grazing, of the solids particles by the predator organisms.

In the present invention the comminution of the solids is carried out at a sufficiently low energy level for no significant rupture of the cell walls to be performed, since we have found that the predators graze on the bacteria and fine particle size solids and obtain the benefit of nutrients within the bacteria and other cellular materials without the need to rupture the cell walls. Typically, less than 20% of the cellular material in the waste or biomass has its cell walls ruptured. This is achieved by the use of suitably short comminution times and/or low comminution energies. A particularly preferred comminution process is one in which cavitation is caused within the fluid phase.

The invention can be applied to a conventional activated sludge process or to other treatment processes where bacteria are used to digest aerobically at least part of a fluid waste material. Thus, the invention can be applied to trickle filter processes, Kaldnes suspended carrier process or agitated tank processes as well as to activated sludge processes. The invention can be applied to waste materials from a wide range of sources which are to be subjected to aerobic bacterial digestion in a fluid phase. However, for convenience, the invention will be described in terms of the activated sludge treatment of a municipal sewage waste material.

It is customary to subject the fluid waste material to an initial solids separation step, for example a coarse screening, so as to remove large solids before the digestion stage. Such initial solids separation can be carried out using any suitable technique and the fluid/solids phase from such initial solids separation stage forms the fluid waste material for the digestion stage of the present invention.

In the method of the invention, at least part of the mixture of waste material solids, bacteria, biomass and water in the digestion stage of the treatment process is subjected to comminution so as to disintegrate larger particles and of aggregates of smaller particles so as achieve the desired optimum particle size in the suspended solids for predator grazing. Such comminution can be achieved at any suitable stage before or during the digestion stage and by any suitable technique. Thus, part or all of the fluid waste material fed to the digestion stage can be subjected to the comminution process, and/or part or all of the digestion mixture can be comminuted at some stage during the digestion stage. Suitable comminution techniques include, for example, shear working by inducing turbulence in the mixture of solids, biomass and water, for example by a high speed stirrer, contra-flow spiral baffles or vanes, contra-rotating paddles; or by using a ball mill. A particularly preferred form of disintegration uses destructive cavitation of the solid particles in the fluid waste material and/or the digestion mixture. Such destructive cavitation can readily be achieved by high pressure homogenisers or other techniques. However, a particularly preferred process uses hydrodynamic cavitation.

As indicated above, the use of too high an energy level during such disintegration results in rupture of the cell walls of cellular components of the mixture, which is not necessary and is wasteful of energy for present purposes. In order to reduce cell wall rupture to less than about 20%, we prefer to apply a hydrodynamic cavitation technique in which a pressure drop is induced as the material flows through one or more nozzle orifices or apertures, thus inducing cavitation turbulence within the fluid phase downstream of the nozzle orifice or the aperture. This results in a transfer of disruptive energy to the solid particles as the cavitation collapses. It will usually be preferred to cause a pressure drop of at least 2 Bar within the fluid phase of the digestion mixture to cause the formation of cavitation bubbles within the fluid phase. Typically, at a pressure drop of 5 to 6 Bar, approximately 4 to 20 Joules per ml of fluid being treated are transferred to the solid particles. This achieves satisfactory disintegration of the solid particles or flocs without significant cell wall rupture, as would be evidenced by an increase in the protein content of the comminuted material. Typically, such a comminution technique releases less than 10 mg/litre of intra-cellular protein from the material being comminuted, whereas high energy sonification releases more than 40 mg/litre of intra-cellular protein.

In a particularly preferred form of the hydrodynamic cavitation process, the fluid/solids digestion mixture or waste material is forced through an aperture, for example a nozzle orifice, whose dimensions and fluid flow therethrough are selected to achieve the desired pressure drop. Typically, the pressure drop required to achieve satisfactory comminution will be in the range 2 to 7.5 Bar, notably from 4 to 6 Bar. It will also be necessary to select the diameter of the aperture and of the conduit carrying the digestion mixture to the aperture so as to achieve the flow rate desired for the operation of the waste treatment process. We have found that a ratio of the cross-sectional area of the flow path of the conduit upstream of the aperture to the effective cross-sectional area of the aperture is preferably within the range 20:1 to 350:1. Preferably, the ratio is greater than 30:1, notably about 50:1 to 150:1. Surprisingly, we have found that cavitation apparatus having such a ratio of conduit to aperture areas can be scaled up successfully, for example to achieve greater flow rates through the apparatus, without the need for significant changes to the value of the ratio.

The aperture can be provided by a single hole in a transverse plate in a conduit or a single nozzle outlet to the conduit. The aperture can be of any suitable shape, for example circular, square or polygonal. However, a circular aperture is preferred. If desired, a plurality of nozzles or apertures can be used so as to achieve a larger flow across the plane of the plate. It is the sum of the cross sectional areas of the apertures or nozzle orifices which gives the effective area of the apertures for calculating the value of the ratio of areas. For convenience, the invention will be described hereinafter in terms of passing a digestion mixture through a single circular aperture or nozzle orifice submerged within a tank or vessel operated at atmospheric pressure.

The flow of the digestion mixture through the aperture conveniently achieved by pumping at least part of the digestion mixture through the aperture using any suitable pump mechanism. Typically, the pump will be a conventional axial flow, centrifugal, gear, peristaltic or other pump. Such a pump may cause some comminution of solids within the pump itself, but this will usually not achieve adequate comminution for the purposes of the present invention.

If desired, air bubbles can be introduced into the fluid phase during the comminution step to assist transfer of energy to the solid particles. For example the digestion mixture may be passed through the throat of a venturi type apparatus and an air stream fed to the throat of the venturi to form bubbles within the digestion mixture.

If desired two or more comminution apparatus may be used in parallel to achieve the desired flow rate of comminuted material into or through the digestion stage. For convenience, the present invention will be described in terms of passing the digestion mixture through a single apertured plate.

Accordingly, the present invention also provides apparatus for the aerobic bacterial digestion of a fluid waste material, characterised in that it comprises:

a. a digestion vessel within which the waste material is to be digested; and b. means by which at least part of the waste material and/or the fluid/solids mixture in the digestion vessel is subjected to comminution so as to reduce its median primary particle size to less than 10 micrometres, said means being characterised in that it is operated at sufficiently low energy input to the waste material that it is adapted to cause no significant rupture of the cells walls of cellular material in the waste material or biomass produced therefrom during the digestion stage.

Preferably, the comminution means imparts less than 20 J/ml energy to the waste material and/or the digestion mixture being comminuted. Preferably, the comminution means comprises a pump means for ejecting waste material and/or digestion mixture through an aperture, for example one or more nozzles, so as to achieve a pressure drop of from 2 to 7.5 Bar across the plane of the aperture.

The comminution process may be carried out at any point during the treatment of the fluid waste material, for example as or before it is fed to the digestion stage. However, the comminution process is preferably carried out on at least part of the fluid waste material during the digestion stage. For example, part of the digestion mixture may be removed from the digestion stage and subjected to the comminution process to disintegrate the biomass flocs and particles and other solids in that mixture. The comminuted mixture can then be recycled to the digestion stage. Since the comminution is designed to enhance the grazing of the predator organisms on the suspended solids or biomass particles, it will be appreciated that such comminution is preferably carried out prior to the establishment of the predator organism population in the digestion mixture.

In a particularly preferred embodiment, the comminution is carried out on a portion of the digestion mixture which has been removed or isolated from the bulk of the material in the digestion stage prior to the establishment of the desired population of predator organisms in that portion. That portion is then returned to the main body of the digestion mixture to supply the desired fine particles for grazing by the predator organisms. Typically, the recycle ratio of the total volume of the digestion mixture to that in the comminution process (the recycle ratio) is from 5:1 to 25:1, preferably about 10:1.

The optimum pressure drop, form and dimensions of the aperture and pump and the recycle ratio can readily be determined by simple trial and error tests within the parameters given above and will vary from waste material to waste material. Usually, variation of the recycle ratio and/or the pump operating pressure can be used to accommodate variations in the waste material, which provides a plant operator with a simple means for ensuring that the comminution is optimised.

The comminution process is carried out to increase the proportion of particles within the digestion stage which are of the optimum size for grazing on by the predator organisms. Typically, the comminution process is carried out to reduce the median particle size of the biomass and other solids to less than 6, preferably from 1 to 3, micrometres, as determined by microscopic examination.

The desired predators for present use are preferably filter feeding helminths, protozoa or metazoa of the rotifer type, notably the bdelloid rotifers *Philodina* spp, *Habrotrocha* spp, *Notommata* spp and *Adineta* spp, and monogonont rotifers, eg *Lecane* spp. Surprisingly, we have found that such rotifers have the unexpected secondary effect of causing some additional flocculation of fine solids within the digestion mixture, thus aiding clarification of the effluent water from the digestion stage. For convenience, the present invention will be described hereinafter in terms of the use of such bdelloid rotifers.

Such rotifers can be cultivated using any suitable technique to provide a source of the organisms of known population density. This can then be used to establish and maintain the desired population of predator organisms within the digestion mixture. We prefer to generate and maintain populations of at least 10,000, preferably more than 50,000, notably more than 100,000, organisms per litre in the portion of the digestion mixture in which grazing on the biomass and suspended solids is to take place. Preferably, the organisms are cultivated within a portion of the digestion mixture so that the organisms can act directly upon the bacteria and biomass.

In an activated sludge process, the throughput of fluid through the digestion stage may be sufficiently great that any predator organisms are swept through the digestion stage and discharged with the water effluent so that they are not available to treat incoming fluid waste materials. In such cases, it is preferred to provide a separate zone or vessel within which the predator population can be generated and maintained. For example, the main digestion vessel can be sub-divided to provide a zone having a lower flow rate of fluid therethrough. Alternatively, as indicated above, a portion of the digestion mixture may be separated off from the main body of the digestion mixture for comminution in a separate vessel. The predator organism culture can be added to this vessel to achieve the desired population level and the populated/comminuted portion then returned to the main digestion vessel to achieve the desired predator population therein. The amount of predator culture added is sufficient to maintain the desired population in the digestion stage and also to make up for any loss of predator organisms from the process, for example for that swept out of the digestion stage in the effluent water discharged from the digestion stage.

In a particularly preferred embodiment, the predator organisms are fed to a filter trap which retains the organisms in the biomass adhering to the surface of the solid members within the trap. Such a filter trap can be provided in a zone within the main digestion vessel or within an external vessel. A particularly preferred form of filter trap is one in which the fluid phase in a vessel flows over or through particles or other solid support materials. These provide a large surface area to which the predator organisms can attach themselves. The attachment and localised reduction of flow rate through and/or over the support material will reduce the washing out of the predator organisms. The support material may be made from plastic particles, notably those available from the Kaldnes company; or may be solid or porous pebbles or lava as used in trickle filters; or may be a metal or plastic mesh material, a mineral wool or glass fibre mat, or tubing or corrugated support members through or over which the fluid to be treated flows. The support material can be retained in position by a grille or other arrangement across the flow path through the filter trap.

As stated above, the predator organisms graze upon the bacteria and solid particles, at least part of which is comminuted biomass, present in the digestion stage and thus reduce the overall amount of biomass produced in the digestion stage. The extent of reduction of the biomass will depend, inter alia, upon the time for which grazing is to take place. This grazing period may by varied by varying the rate and volume of digestion mixture cycled through the separate vessel to which the predator organisms are added as described above. The reduction in biomass will also be affected by the species and level of the population of predators which is maintained in the digestion or other zone in which grazing on the bacteria and biomass takes place; on the temperature maintained within such a zone; and the nature of the waste material being treated. The optimum predator population and grazing time for any given case can readily be determined by simple trial and error. Once an optimum set of operating conditions has been established, the operator can vary the population of predators within the system to ensure that the optimum reduction in biomass is achieved if other operating conditions vary. Alternatively, the recycle ratio of the portion of the digestion mixture removed for comminution and predator population, to the whole digestion mixture, can be varied to alter the residence time of the predators within the main digestion zone and thus vary the extent of grazing achieved.

The grazing of the predator organisms on the solid particles reduces the loading of fine suspended solids in the effluent water. Typically, the presence of predator organisms in the digestion stage will reduce the amount of suspended solids having particle sizes in the range 0.2 to 6 micrometres in the effluent water by up to 95%. Since some of the predator organisms will be carried out of the digestion stage in the effluent water, grazing on the suspended solids by the predator organisms may continue after the effluent water leaves the digestion stage. It may be desirable to provide a settling tank or the like in which the effluent water is held prior to discharge to the environment or re-use. Such a settling tank not only provides a zone in which suspended solids can agglomerate and precipitate, but also provides a zone in which grazing of the suspended particle can continue. As stated above, we have found that the use of bdelloid rotifers has the surprising effect of enhancing the flocculation of fine solids during the digestion stage and/or during the settlement stage. Alternatively, this settlement zone may be provided by a vessel having a tortuous flow path for the effluent water therethrough so as to provide a prolonged residence time therein to enable grazing of the fine solid particles to take place. If desired, some or all of the predator organisms required for the digestion stage may be added to such a settling tank or vessel and part of the effluent water containing such organisms recycled to the digestion stage to provide the predator organisms required in the digestion stage.

As a result, the method of the invention not only reduces the biomass production in an activated sludge process, typically by at least 10 to 30%, but also clarifies the effluent water. Typically, we have found that the effluent water from the method of the invention contains less than 10% of the suspended solids found in effluent water from a process where no predator grazing has taken place, notably where a settling tank is used after the digestion stage, so that the effluent water can be discharged directly to the environment without further filtration or other treatment. The presence of predator organisms in the discharged water is usually not environmentally detrimental. Indeed, some of the predator organisms are used as foodstuffs for farmed fish and may thus be beneficial where the effluent water is discharged into rivers or lakes.

DESCRIPTION OF THE DRAWINGS

The invention will now be described with reference to a preferred embodiment as shown in the accompanying drawings in which.

DESCRIPTION OF THE PREFERRED EMBODIMENT

Samples of the effluent from a Kaldnes (K1) "Monster" moving bed reactor plant were taken before the clarification stage. Small activated sludge samples were taken from the aerobic zone of an activated sludge sewage treatment plant, large samples (>20 litre) were taken from the outlet of the plant. The samples were autoclaved immediately after sampling and were determined to have a median particle size in the range 1 to 3 micrometres.

Figure 1:
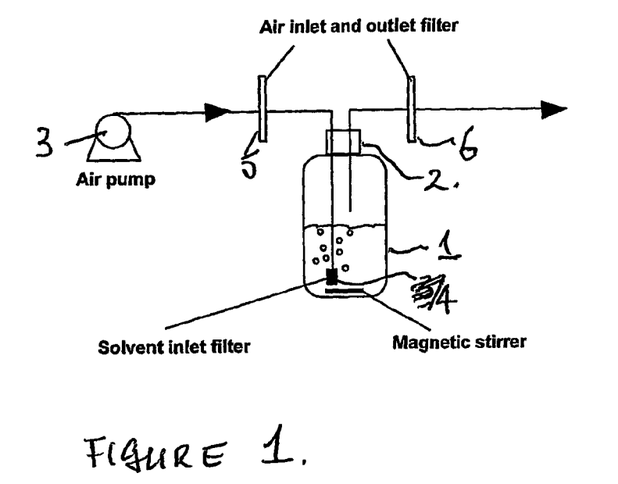
FIG. 1 is a schematic representation of a small scale plant for testing the grazing of rotifers on solids in a fluid waste.

The samples were introduced into reactors as shown in FIG. 1. These comprised Duran bottles 1, which were sealed with special bottle cap assemblies 2 (Anachem, A-610). The samples were aerated using an aquarium air pump 3 dispersing the air through a solvent inlet filter 4 (Anachem, A-310). The air was sterile-filtered using Hepa-Vent 0.3 µm glass microfibre filters 5 and 6 at the air inlet and outlet points. The reactors were operated with sample volumes of either 400 ml or 900 ml and with light aeration.

In reactors operated with activated sludge samples, the antibiotics ampicillin and kanamycin were added at 100 ug/ml to prevent growth of *E. coli*, on which rotifers are known to graze. Prevention of bacterial growth was confirmed after plating reactor samples on plan LB agar and incubation at 37° C. overnight. The addition of antibiotics was not necessary in samples from the Kaldnes plant effluent, as bacterial growth was extremely limited in these samples.

Rotifers of the genus *Philodina* were added to each of the bottles 1 from tissue culture flasks containing a known number of organisms which had been grown under sterile conditions. The reduction in solids content in each sample was observed using microscopic examination.

In those cases where rotifers had been added, a reduction in the optical density, the turbidity, of the reaction mixture was noted, indicating that at least some of the solids had been ingested by the rotifers and removed from the aqueous phase.

Individuals of the rotifer clone *Philodina roseola* P1 were sampled and fed for three days on suspensions of fluorescent polystyrene particles (micromer blueF plain, Micromod) of the sizes 0.2 µm, 1 µm, 3 µm, 5 µm, 7 µm and 10 µm in a multi-well culture plate. The rotifers were observed and photographed with the Ortholux microscope (filter A, excitation: 340–380 nm, band pass >430 nm). Where particles of a particular size were successfully ingested, fluorescence was clearly visible in the gut of the rotifer. These test showed that the rotifers ingested particles in the size range 0.2 to 3 micrometres. Some of the larger particles, up to 10 micrometre size, were ingested by mature organisms.

These tests show that rotifer organisms feed on solid particles in effluent waste and that the particles ingested by rotifers are of the size range 0.2 to 10 micrometres.

Figure 2:
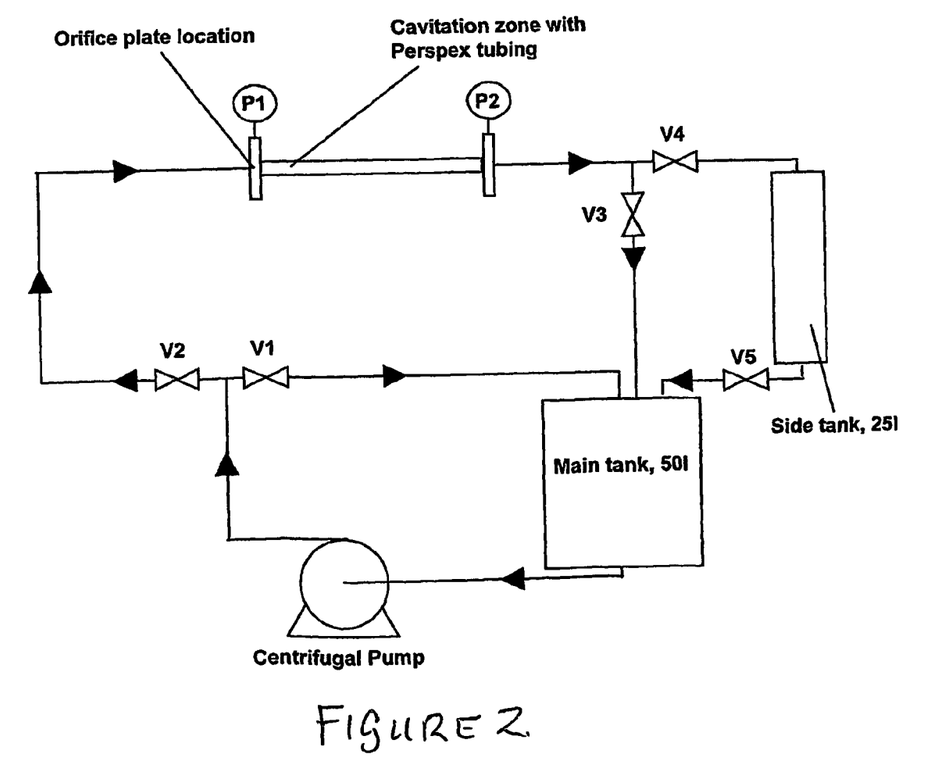
FIG. 2 is a schematic representation of a cavitation apparatus for the treatment of the digestion mixture in a sewage treatment process.

Samples of the effluent were subjected to cavitation in a cavitation apparatus shown in FIG. 2. This comprises a main holding tank 10 with a capacity of 50 litre and a side tank 11 of capacity 25 litre. A centrifugal pump 12 (EVM, model EVM2 7N/0.75) was used to circulate effluent through the apparatus. The piping used to connect components of the apparatus was PVC tubing with an inner diameter of 37 mm and the valves used were full bore valves. Two Bourdan-type pressure gauges 13, 14 were used, measuring upstream and downstream pressure, before and after the orifice plate 15. A clear piece of Perspex tubing 16 was installed after the orifice plate 15 so that the cavitation zone could be observed visually. The orifice plate 15 was made of 2 mm metal plate and was interchangeable with plates having different diameter orifices or could be removed altogether. Two metres of straight piping 17 were located immediately upstream of the orifice plate 15.

Sludge was sampled from the outlet of an activated sludge plant and the main tank 10 was filled with some 23 litre of this sludge. With the pump 12 on and valve V2 fully open, valve V1 was slowly closed until completely closed. The sludge was pumped through the orifice plate 15 and the pressure drop across the orifice measured by pressure gauges P1 and P2. Valve V3 was initially closed and V4 open and the flow rate of the sludge was determined and the sludge recycled to the main tank.

Three identical apparatus were operated in parallel. Feed was taken from the main feed pipe of the sewage works and mixed in equal amounts (5 litre/min) in the mixing tank.

Through an overflow pipe, the liquid was transferred into a main aeration tank, with a volume of 1.2 m$^3$ aerated with 2 ppm oxygen. The activated sludge was then transferred via an overflow pipe to the settling tank ("clarifier", volume of ca. 1 m$^3$). Recycled activated sludge (RAS) was recycled to the mixing tank and the clarified water was sent to the main treatment works inlet. Waste activated sludge was removed directly from the main aeration zone (150 ml/min), using peristaltic pumps.

Return activated sludge (RAS) was pumped from the inlet from the activated sludge plant directly into the main tank 10, using a peristaltic pump. The centrifugal pump 12 of the cavitation unit was switched on when the main tank 10 was filled with ca. 35 litre of sludge and switched off, when the level fell below ca. 5 litre. Valve V4 was minimally closed to allow for some back-pressure to build up and cavitation to form. Cavitated RAS was immediately recycled into the main aeration tank of the pilot plant.

Figure 3:
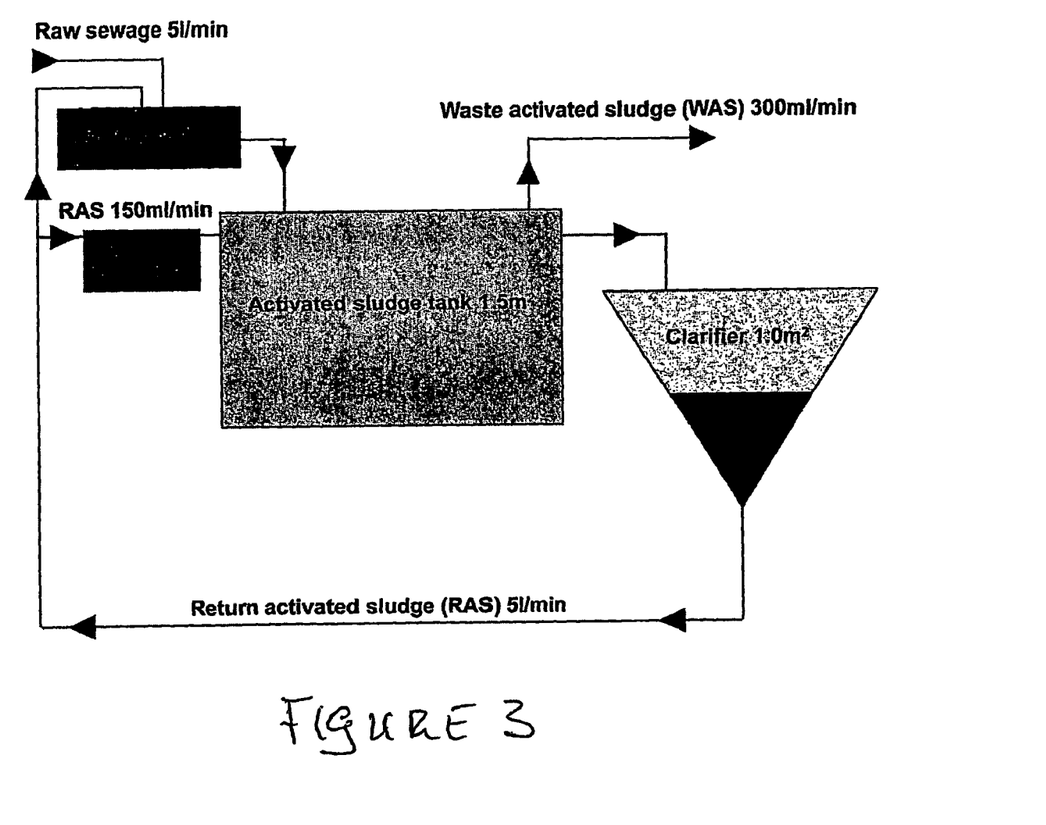
FIG. 3 is a schematic representation of a small scale plant for the evaluation of the effect of the presence of rotifer populations on the clarification of effluent which has been subjected to particle size disintegration using a cavitation treatment.

The hydrodynamic cavitation apparatus shown in FIG. 2 was installed above the pilot scale apparatus shown in FIG. 3 and connected to the duplicate lanes of the pilot scale apparatus using flexible tubing. RAS was pumped into the main tank of the cavitation apparatus with a speed of half the WAS speed at the time, usually 75 ml/min. With RAS twice the particle concentration of the WAS, this meant that each particle was on average treated once per sludge passage.

The particle size of the comminuted material from the cavitation apparatus was evaluated by microscopic examination. Pictures of the material were taken using a Leitz Ortholux II fluorescent microscope, a JVC TK-C1381 video camera and a Sony DSR-20P digital video recorder connected to an Apple Mackintosh G4 computer. Pictures were captured using Adobe Premiere 5.1 and were exported to NIH Image 1.61. Particle size was calibrated using 1 μm fluorescent polystyrene beads (micromer blueF plain, Micromod GmbH). The size of particles from turbid supernatants of autoclaved sludge was analysed using the calibrated system.

A HIAC VersaCount particle analyser was also used to analyse particle size range distribution of cavitated sludge particles. The machine was calibrated, using 10 ml samples containing mono-sized beads of known concentration. The machine displayed results at given particle sizes of 2, 3, 5, 10, 15, 20, 25 and 50 μm. As the optimum particle concentration was in the order of ca. 10,000 particles per ml, samples were diluted using distilled water. Typically, 1 ml of sludge sample was diluted to a total volume of 50 ml and two samples were measured for each data-point.

Cavitation tests were carried out using orifices of diameters of 3, 5 and 8 mms, which gave ratios of the pipe diameter to orifice diameter of 20:1, 50:1 and 150:1. The pressure drop across the orifice was measured at from 2 to 6 Bar. Below about 2 Bar no cavitation was detected. At a pressure drop in excess of about 7 Bar significant cell rupture as exhibited by a rise in the protein content of the cavitated material. At an orifice diameter of 8 mms cavitation was not achieved, whereas satisfactory cavitation was achieved with the 5 and 3 mms diameter orifices at pressure drops of between 2.5 and 6, preferably at about 4.8, Bar and the particle size range in the cavitated samples was predominantly in the range 1 to 5 micrometres.

Optical density at 600 nm ($OD_{600}$), measured in a Jasco 7800 Spectrophotometer, was used to determine wastewater turbidity. Five 1 ml samples were measured and the standard deviation calculated.

Wastewater from a Kaldnes wastewater treatment plant was collected prior to the clarifier and autoclaved. Autoclaving sterilised the samples and produced a suspension of many small sludge particles similar to pin flocs. The effluent was subjected to cavitation using a 5 mms orifice at a pressure drop of 4 Bar using the apparatus of FIGS. 2 and 3 operated in parallel in two lightly aerated batch mini-reactors. One reactor was used as a control, the other was inoculated with ~50,000 rotifer/l of the genus *Philodina*. The optical density of the suspension was measured at 600 nm ($OD_{600}$) periodically and the experiment run for 67.5 hours. In the control reactor without rotifers, $OD_{600}$ dropped from 0.158 to 0.099, indicating a degree of clarification of ~37%, due to particle settling. In comparison, the reactor with 50,000 rotifers/l showed an improved clarification to a value of 0.006, representing particle removal of 96%.

Four identical reactors containing Kaldnes wastewater were run in parallel with rotifers at densities of 0, 2,000, 10,000 and 50,000 rotifers/l respectively, over a period of 88.5 hours. Initial $OD_{600}$ values were in the range of 0.150 to 0.183. The clarity of the suspension in all four reactors dropped significantly with time, but for the reactor with the highest rotifer density (50,000 rotifers/l), almost all particles were removed from suspension within 48 h. In comparison, $OD_{600}$ in the control reactor without rotifers dropped by 39% in 48 h, compared to the starting value, demonstrating that comminution of the solids in the waste water had a beneficial effect. The $OD_{600}$ in the reactors with 2,000 rotifers/litre and 10,000 rotifers/litre dropped to 0.068 and 0.048 respectively, within 48 h, thus showing that rotifers were involved in particle removal.

To exclude the possibility that rotifers simply function passively as flocculants, without a requirement for an active process, rotifers were exposed to a brief burst of microwave radiation (10 second, 800W), resulting in a killing rate of 100%, but without apparent structural damage. Three mini-reactors containing Kaldnes wastewater were set up, one with 50,000 live rotifers/l, one with 50,000 dead rotifers/l and one without rotifers. $OD_{600}$ was measured over a period of 44 hours. Initial $OD_{600}$ in all three reactors was determined to be in the range of 0.145 to 0.157. After 44 hours, only the reactor containing live rotifers showed a significantly reduced optical density when compared to the control reactor without rotifers. The absorption was reduced to 0.006 compared to 0.078 in the control and to 0.106 in the dead rotifer. This demonstrates a 96% clarification of particles in suspension in the live rotifer reactor, whereas the control and the dead rotifer reactors only showed clarification of 50% and 27% respectively, compared to their starting values. This experiment shows that live rotifers are required for effective particle removal.

Experiments were performed which measured changes in the amount of biomass in the system. The biomass present in waste waters is usually expressed as total suspended solids (TSS). For this work, wastewater from a conventional activated sludge plant was used. If rotifers feed on particles in waste water, a reduction in biomass of the system, due to partial mineralisations, should be observed. However, the amount of solids in suspension will depend on the degree of agitation of the wastewater sample. In the following experiments, therefore, TSS was measured either with or without stirring at sampling times. This also allowed information to be obtained on whether rotifers influence settling of particles in suspension.

Activated sludge was sampled, autoclaved and the supernatant transferred into four mini-reactors. Two of these mini-reactors, one seeded with 100,000 rotifers/l, the other without rotifers, were not disturbed prior to sampling for TSS and $OD_{600}$ analysis. The two other mini-reactors, again with or without rotifers at 100,000/l, were mixed vigorously prior to sampling, using a magnetic stirrer. In the latter two reactors, total biomass was measured, including that which had settled out. The experiment was operated for 48 hours. At the start of the experiment, all reactors had an OD600 within the range of 0.286 to 0.301 and TSS ranged from 128 mg/l to 146 mg/l. During the course of the experiment, $OD_{600}$ of the control reactors decreased by 13% for the undisturbed and by 5% for the stirred reactor. In comparison, the reactors containing 100,000 rotifers/l showed a reduction in $OD_{600}$ of 33% for the undisturbed reactor and of 20% for the stirred reactor. A similar result was observed for solids in suspension. The controls showed a decrease in TSS of 18% for the undisturbed reactor and no change in the stirred reactor. In contrast, TSS in the rotifer reactor decreased by 38% in the undisturbed and by 11% in the stirred reactor. As measurements of stirred reactor samples indicate the total biomass in the system, it can be concluded that the total biomass in the reactor containing rotifers was reduced by ~11%. The settling effect of rotifers in addition to the natural settling process decreased suspended biomass by ~10%. In a second experiment, 200,000 rotifers/l were added to activated sludge and incubated for 24 hours. TSS was decreased by ~9% in the stirred reactor containing rotifers, compared to no significant change of TSS in the stirred control reactor. In the unstirred control reactor, TSS was decreased only insignificantly, but was decreased by 34% in the reactor containing rotifers. This results in a total loss of biomass of ~9% and an additional settling effect of ~25% due to the presence of rotifers.

The invention claimed is:

1. A method for aerobic biological digestion using bacteria of a fluid waste material having a fluid phase and particulate solids, wherein:
   a. at least part of the solids in the fluid material are subjected to a particle comminution step using an energy input so as to produce comminuted solids which have a median particle size of less than 10 micrometres without causing significant rupture of cell walls of cellular material within the solids; and
   b. the digestion of the waste material is carried out in a bacterial digestion stage in the presence of a population of at least 10,000 organisms per litre of the fluid phase of one or more predator organisms for the bacteria digesting the waste material, which predator organisms ingest the bacteria and comminuted solids so as to reduce the biomass and solids in the treated waste material.

2. A method as claimed in claim 1, wherein the energy input to the fluid during the comminution step is less than 20 J/ml.

3. A method as claimed in claims 1, wherein the comminution step is achieved by subjecting at least part of the fluid waste material to destructive cavitation.

4. A method as claimed in claim 1, wherein:
   a. the fluid waste is a municipal sewage;
   b. the sewage is subjected to an activated sludge process in an aerobic liquid phase digestion stage for digesting the waste material; and
   c. the comminution step is applied to at least part of the digestion mixture of such a digestion stage.

5. A method as claimed in claim 4, wherein at least part of a digestion mixture of the fluid waste is removed from the digestion stage and is subjected to a comminution step in a separate vessel and the comminuted mixture is recycled to the digestion stage.

6. A method as claimed in claim 5, wherein the ratio of the total digestion mixture to the amount of the comminuted mixture being recycled is from about 5:1 to 25:1.

7. A method as claimed in claim 1, wherein the comminution step is carried out using an hydrodynamic cavitation technique in the liquid phase.

8. A method as claimed in claim 7, wherein the comminution step is carried out by passing the fluid through an aperture with a pressure drop of from about 2 to 7.5 Bar across the aperture.

9. A method as claimed in claim 8, wherein the pressure drop is from about 4 to 6 Bar.

10. A method as claimed in claim 1, wherein the comminution step is carried out to produce solid particles having a median particle size in the range from about 1 to 10 micrometres.

11. A method as claimed in claim 1 wherein the predator organisms comprise organisms of the bdelloid rotifer species.

12. A method as claimed in claim 1, wherein the population of predator organisms is established and maintained in the digestion stage.

13. A method as claimed in claim 12, wherein the population is maintained by the use of a zone within the digestion stage in which the organisms can be retained.

14. A method as claimed in claim 13, wherein digestion of the waste material is carried out in a digestion vessel having a predator organism retention zone within the digestion vessel.

15. A method as claimed in claim 14, wherein the retention zone comprises a filter trap upon which the predator organisms can attach and through which the fluid phase can flow.

16. A method as claimed in claim 1, wherein the digestion stage is carried out in a digestion vessel and the predator organism population is generated in a vessel separate from the digestion vessel but in fluid flow communication with the digestion vessel.

17. A method as claimed in claim 1, wherein the predator organism population is at least about 50,000 organisms per litre of the fluid phase in the digestion stage.

18. A method as claimed in claim 1, wherein the predator organism is selected from *Philodina* spp, *Habrotrocha* spp, *Adineta* spp, *Notommata* spp and *Lecane* spp.

19. A method for the treatment of a fluid waste material in which the waste material is subjected to a process of aerobic bacterial fluid phase digestion in a digestion stage to produce biomass particles and a water effluent, characterized in that:
   a. at least part of the digestion of the waste material is carried out in the presence of a population of predator organisms which graze upon at least some of the bacteria used to digest the waste material and the biomass particles, which population is maintained at a level of at least about 10,000 of such organisms per litre of the fluid phase in the digestion stage; and
   b. at least part of the waste material, the biomass and other solids present in the digestion stage are subjected to a comminution process so as to reduce the average particle size of the biomass solids to less than 10 micrometres, without causing significant cell rupture of cellular components of the waste material or biomass, so as to enhance grazing of the solids particles by the predator organisms.

20. An apparatus for carrying out the method as claimed in claim 1, which apparatus comprises:
   a. a digestion vessel within which the waste material is to be digested; and
   b. means by which at least part of the waste material is subjected to comminution so as to reduce its median primary particle size to less than about 10 micrometres, said means being characterized in that it is adapted to be operated at sufficiently low energy input to the waste material that said means is adapted to cause no significant rupture of the cell walls of cellular material in the waste material or biomass produced therefrom during the digestion stage; and
   c. a zone in which a population of an organism which is a predator for the bacteria to be present in the digestion stage can be generated and maintained.

21. The apparatus as claimed in claim 20, wherein the means for comminuting the waste material comprises a pump means adapted to cause at least one of the waste material and the digestion mixture to flow through at least one aperture at a pressure drop of from about 2 to 7.5 Bar across the plane of the aperture.

22. Apparatus as claimed in claim 20 wherein the zone for generating the predator organism population is a zone within the vessel within which the digestion is to be carried out and means are provided for circulating at least part of the digestion mixture through that zone.

23. Apparatus as claimed in claim 20, wherein the zone for generating the predator organism population comprises a separate vessel from that in which the digestion is to be carried out and means are provided for circulating at least part of the digestion mixture through that separate vessel.

24. Apparatus as claimed in claim 20, wherein the digestion vessel is provided with a filter trap upon which the predator organisms are to be attached and through which the digestion mixture is adapted to flow.

25. Apparatus as claimed in claim 21, wherein a flow path cross sectional area upstream of the aperture is from about 20 to 350 times the total cross sectional flow area of the flow paths through the aperture(s).

* * * * *